May 7, 1968      H. D. MARKMAN      3,381,392
ENDOSCOPE SLIDE VIEWER
Filed April 11, 1966
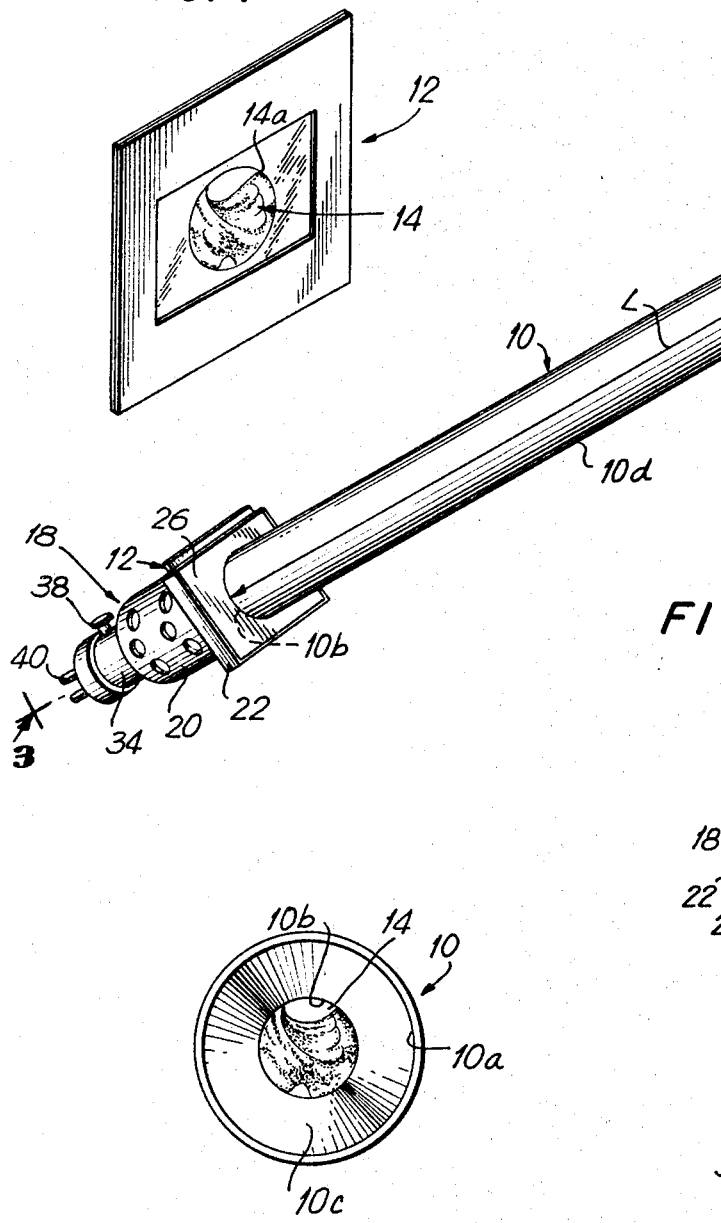
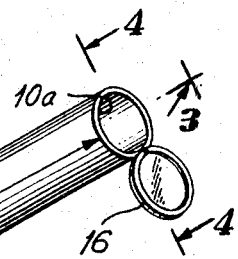
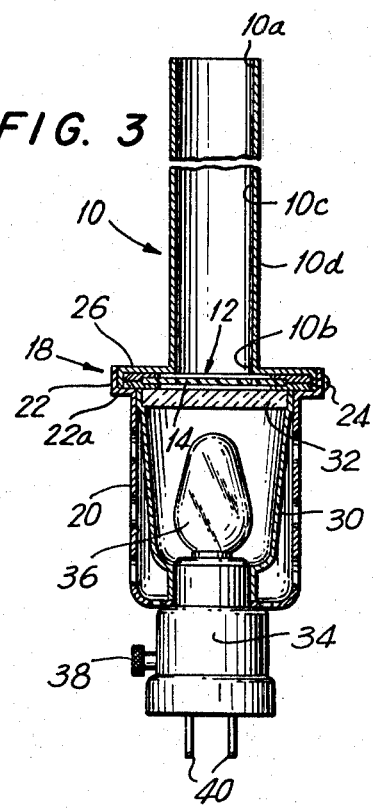
INVENTOR.
H. DAVID MARKMAN
BY
Amster & Rothstein
ATTORNEYS

United States Patent Office 3,381,392
Patented May 7, 1968

3,381,392
ENDOSCOPE SLIDE VIEWER
Harry David Markman, 2396 Morris Ave.,
Bronx, N.Y. 10468
Filed Apr. 11, 1966, Ser. No. 541,840
1 Claim. (Cl. 35—17)

ABSTRACT OF THE DISCLOSURE

An internal anatomy teaching aid for displaying film or slides produced from endoscopy wherein the slide viewer is tubular and otherwise a simulation of the medical instrument, such as a sigmoidoscope or the like, and the student when using such slide viewer therefore also receives training in internal anatomy recognition as. would result from using the actual medical instrument to view the internal anatomy in question.

The present invention relates generally to apparatus and an improved method of presenting slides, such as those displaying anatomical subject matter previously photographed through an endoscope, for study by student groups. More particularly, the invention relates to an improved teaching aid in the form of such apparatus and display method wherein the anatomical subject matter being studied is viewed under conditions realistically simulating those conditions existing when such anatomical subject matter is seen during an actual examination of a patient.

The investigation and study of internal anatomy is often made through an endoscope. As a logical extension of this procedure, the anatomy under study is often photographed, processed into slides, and then used as a teaching aid to instruct medical students in the recognition of abnormal or normal conditions of such anatomy. The current use of these slides is in conjunction with conventional slide viewers or projectors wherein a magnified version of the anatomical subject matter is presented for study by the student.

In contrast to the foregoing, an essential contribution of the present invention is the appreciation that slides produced from endoscopy are more effectively used for student instruction when displayed for viewing in the same circumstances and environment in which the student would view the same during actual examination of a patient. This includes not only a display presenting the anatomy substantially in life-size but one requiring the exercise by the student of the same degree of depth perception as is required during an actual examination on a patient. Thus the inventive contribution hereof is founded on the belief that a student trained to recognize anatomy from a conventional enlarged projection of a slide may nevertheless still be inadequately instructed since recognition is not related to the actual environment which the student will encounter in practice nor is it related to the depth perception at which the anatomy will be viewed by the student during an actual examination.

It is thus an object of the present invention to provide a slide viewer and a display method for presenting slides resulting from endoscopy studies which overcome the foregoing and other inadequacies and shortcomings of the prior art. Specifically, it is an object to provide a slide viewer for displaying such slides and employing a method of presentation thereof which, during use as a teaching aid, realistically simulates actual examination procedures including the exercise by the student of the same degree of depth perception during study of the slides as is required during an actual examination.

An endoscope slide viewer embodiment demonstrating features and advantages of the present invention includes a hollow, tubular body terminating at opposite ends in a distal end opening and a proximal end opening. Slides are positioned adjacent the distal end opening in appropriate structure for supporting and illuminating the same and are viewed through the hollow, tubular body from the proximal end opening. A significant structural feature is that the interior wall of the hollow body is free of obstructions between the two end openings and is of a length and configuration which results in the slide being displayed in a manner realistically simulating the environment in which the anatomical subject matter on the slide is seen during an actual examination of a patient.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of previously photographed anatomical subject matter displayed on a slide;

FIG. 2 is a perspective view of a device for viewing the slide of FIG. 1 and demonstrating features of the present invention;

FIG. 3 is a longitudinal sectional view taken on line 3—3 of FIG. 2 illustrating features of construction of the slide viewer hereof; and FIG. 4 is a view looking in the direction of the arrows on line 4—4 of FIG. 2 and diagrammatically illustrating the appearance of the anatomical subject matter on the slide as seen through the slide viewer hereof.

Reference is now made to the drawings wherein there is shown a slide viewer, generally designated 10, demonstrating features of the present invention. Slide viewer 10 has particular application as a teaching device for studying slides, such as the slide 12 illustrated in FIG. 1 which has previously photographed anatomical subject matter 14 confined within a characteristic circular boundary 14a. In the medical field, investigation and study of internal anatomy is often made through an endoscope and as a logical extension of this procedure, the anatomy being studied is often photographed. These photographs in turn are then usually mounted as slides 12 with the anatomical subject matter 14 confined within a characteristic circular boundary 14a corresponding to the circular shape of the internal wall of the endoscope. The photography of anatomical subject matter through a proctosigmoidoscope during rectal examination is exemplary of an internal examination which is often productive of slides 12 which are then used in the instruction of medical students. As now used, however, the slides 12 are placed in conventional projecting or slide viewing devices which function to magnify the anatomical subject matter in order to increase and further the understanding of the students to the content thereof.

In sharp contrast to the foregoing, an essential contribution of the present invention is the appreciation that the most effective use that can be made of anatomical-displaying sides 12 as teaching aids is to display these slides for viewing in the same circumstances and environment in which the student would view the same during an actual examination of a patient. This not only accustoms the medical student to a perspective of the anatomy as the same is actually encountered, but this manner of displaying the anatomical subject matter both for the young medical student and also for the experienced practitioner requires the exercise of the same depth perception in the viewer during study of the slide as is required during an actual examination. The slide viewer 10 hereof thus requires the individual exercise and development of depth perception to keenly observe and note the detail in the anatomical subject matter 14 that is required for diagnostic procedures during an actual examination on a patient, whereas the depth perception of the viewer is never a factor during study of the slide 12 by conventional slide projecting and viewing devices. A student trained to recognize abnormal anatomy from a conventional enlarged projection of a slide 12 may nevertheless still be inadequately instructed since recognition is not related to the actual environment which the student will encounter in practice nor is it related to the depth perception at which the anatomy will be viewed by the student in practice.

The photographed anatomical subject matter 14 as diagrammatically illustrated in FIG. 4, to which reference is now made, is illustrated as it is seen through the slide viewer 10 hereof by a viewer looking through the proximal end opening 10a of the slide viewer. The anatomical subject matter 14 is positioned adjacent the distal end opening 10b and, as seen by the viewer, the unobstructed interior wall 10c of the slide viewer 10 frames the subject matter centrally thereof and together with the subject matter 14 represents the total display that is seen by the student using the slide viewer 10. Further, this total display 14, 10c is a realistic simulation of the actual circumstances and environment in which the student would view the anatomical subject matter during an actual examination of a patient. That is, the peripheral vision of the viewer is substantially restricted or confined to the circular boundary 14a of the photographed anatomical subject matter 14 by viewing the same through the hollow tubular slide viewer 10 and this restricted view of the subject matter 14 is furthermore maintained at a distance from the viewer which requires the same depth perception as is required during an actual examination of the patient. The means for maintaining this simulated environment which requires the same depth perception by the viewer during study of the slide as is required during an actual examination may be achieved in several ways. One way is optically wherein various optical elements such as lenses or the like having the appropriate optical characteristics are utilized to display the subject matter 14 so that it appears to be located at various distances from the viewer and such optical devices include adjusting means for correlating this distance to the distance at which the subject matter is seen during an actual examination of a patient. Another and a preferred manner of achieving this simulation of depth perception of the endoscope, however, is by actually providing a length in a tubular body of the slide viewer 10 which is substantially the same as the length of the endoscope, sigmoidoscope or other medical instrument through which the anatomy was photographed in the first instance. The embodiment of the slide viewer 10 is illustrated in the drawings and described herein.

Referring more particularly to FIGS. 2, 3, and illustrated embodiment 10 of an endoscope slide viewer includes a hollow, tubular body 10d having a proximal end opening 10a and a distal end opening 10b at respective opposite ends thereof. Assuming specific use of the slide viewer 10 as a teaching aid for studying anatomical subject matter photographed through a proctosigmoidoscope, the length L of the tubular body 10b will be understood to be approximately equal to that of a usual proctosigmoidoscope, such length being usually in excess of twelve inches. In any event, the length L exceeds the length that normally is provided or is required in conventional slide viewing apparatus between the slide viewer opening and slide mounting structure thereof for conventional purposes such as focusing or similar functioning of such slide viewers. Additionally, the diameter of the tubular body 10d is substantially equal to that of a conventional proctosigmoidoscope. Still further, the interior area of the tubular body 10d which is bounded by the internal wall 10c is free of all obstructions, and in all other respects simulates the internal conditions of a proctosigmoidoscope so as to provide an unobstructed view of the photographed anatomical subject matter 14 being displayed adjacent the distal end opening 10b. A pivotally mounted lens element 16 is provided at the proximal end opening 10a in duplication of the usual and conventional construction of proctosigmoidoscopes which also include such a lens element.

At the opposite or distal end of the slide viewer 10 there is provided appropriate means 18 for supporting and illuminating the slide 12 in the operative position adjacent the distal end opening 10b so that such slide may be viewed through the slide viewer 10. In the embodiment illustrated herein, the means 18 includes a hollow housing 20 having a mounting lip 22 at one end which is adapted to be fitted about and engaged, as at 24, to a flat plate-like structure 26 which is formed integrally on the distal end of the tubular body 10d. A transverse wall 22a of the mounting lip 22 cooperates with the plate 26 to define therebetween an appropriate slide-mounting opening 28 for supporting the slide 12 in an operative position for viewing adjacent the distal end opening 10b. Disposed within the housing 20 is a mounting element 30 which mounts a light diffusing element 32 at the forward end thereof. At the opposite end, the mounting element 30 engages a conventional light socket 34. In practice, the socket 34 is supplied with a bulb 36 and includes a switch 38 and contacts 40 for being connected with an electrical source energizing the bulb 36 which, in turn, illuminates the slide 12.

From the foregoing, it will therefore be appreciated that the slide viewer 10 hereof represents a noteworthy and effective teaching instrument, particularly in the medical field, for studying anatomy which is photographed through an endoscope and displaced on slides. By viewing the slides through the slide viewer 10 hereof, the student sees the displayed anatomy in an environment realistically simulating the environment in which this anatomy is seen during an actual examination of a patient. This helps the student to more readily make the transition from the classroom to actual practice and it also results in a more precise and complete instruction to the student who learns not only the telltale detail associated with a particular abnormal anatomical condition but also has practice recognizing this detail at the depth perception at which the student would be required to recognize the same during an actual examination on a patient.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A teaching aid for studying anatomical subject matter photographed through an endoscope and displayed on a film comprising a film viewer having a hollow body which is substantially cylindrical in shape and of an elongated configuration terminating in a distal end opening and a proximal end opening, means for supporting and illuminating said film adjacent said distal end opening for viewing through said hollow body from said proximal end opening, said hollow body having an interior wall which is substantially parallel to the longitudinal axis thereof and is free of obstructions extending from said distal end opening to said proximal end opening and being of a length and configuration which results in said film being framed centrally by said interior wall as viewed through said proximal end opening, said distal opening being circular in shape and substantially the same size and shape as the subject matter displayed on said film.

References Cited

UNITED STATES PATENTS

| | | | |
|---|---|---|---|
| 1,504,989 | 8/1924 | Spitzer | 40—63 X |
| 2,125,871 | 8/1938 | Austin | 35—17 |
| 2,493,770 | 1/1950 | Manning | 35—8 |
| 3,177,593 | 4/1965 | Loeb | 35—17 |

EUGENE R. CAPOZIO, *Primary Examiner.*

H. S. SKOGQUIST, *Assistant Examiner.*